(12) United States Patent
Cohen et al.

(10) Patent No.: US 9,286,598 B2
(45) Date of Patent: Mar. 15, 2016

(54) SEAMLESS UPLOAD AND INGEST OF RELEASE FORMS FROM A MOBILE DEVICE TO A DIGITAL MEDIA SYSTEM

(75) Inventors: Laurence G. Cohen, Seattle, WA (US); Scott J. Fischer, Seattle, WA (US); Cameron Neblett, Tacoma, WA (US)

(73) Assignee: CORBIS CORPORATION, Seattle, WA (US)

( * ) Notice: Subject to any disclaimer, the term of this patent is extended or adjusted under 35 U.S.C. 154(b) by 664 days.

(21) Appl. No.: 12/905,890

(22) Filed: Oct. 15, 2010

(65) Prior Publication Data

US 2012/0096339 A1 Apr. 19, 2012

(51) Int. Cl.
| | |
|---|---|
| *G06F 17/30* | (2006.01) |
| *G06Q 10/10* | (2012.01) |
| *G06F 3/00* | (2006.01) |
| *H04W 4/00* | (2009.01) |
| *G06F 21/10* | (2013.01) |
| *H04L 29/08* | (2006.01) |

(52) U.S. Cl.
CPC ............... *G06Q 10/101* (2013.01); *G06F 3/00* (2013.01); *G06F 21/10* (2013.01); *H04L 67/06* (2013.01); *H04W 4/00* (2013.01); *H04L 67/04* (2013.01)

(58) Field of Classification Search
CPC ........................................................ G06F 17/30
USPC ........................................................... 715/221
See application file for complete search history.

(56) References Cited

U.S. PATENT DOCUMENTS

| | | | |
|---|---|---|---|
| 7,533,417 B2 * | 5/2009 | Belz | 726/26 |
| 8,065,166 B2 * | 11/2011 | Maresh et al. | 705/3 |
| 2001/0034648 A1 * | 10/2001 | Caldwell | 705/14 |
| 2007/0070434 A1 * | 3/2007 | Egan et al. | 358/403 |
| 2009/0048860 A1 * | 2/2009 | Brotman et al. | 705/1 |

* cited by examiner

*Primary Examiner* — Kavita Padmanabhan
*Assistant Examiner* — Tionna Burke
(74) *Attorney, Agent, or Firm* — Soquel Group LLC

(57) ABSTRACT

Embodiments are directed towards providing a method, a system and a network device for applying a form to a media item in a media library, including enabling, by a mobile device, a contributor of media items to prepare a form, uploading, by the mobile device, the form to a server computer that manages a media library, the media library being a collection of media items and forms associated with one more of the media items, enabling a contributor to upload, from a client computer, different than said mobile device, media items to the media library and enabling, by a client computer that communicates with the server computer, the contributor to associate the form with one or more media items uploaded by the contributor.

20 Claims, 10 Drawing Sheets

*Apply Release*
300

Apply Release

| | Model/Property | Reference | Type | |
|---|---|---|---|---|
| 302 | Anne Tyler | SuperHero 06/28/... | Model | Apply |
| | Chicago Zoo | ChiLion1 06/27/2010 | Property | Apply |
| | Steve Mophelium | ChiLion1 06/27/2010 | Model | Apply |
| | Lane Theater | AsGoodAs 06/19/20... | Property | Apply |

*FIG. 3A*

*Create Release*
320

Create Release

322 — ● Model Release  ○ Property Release

324 — Model Information
Model Name: [ ]
Age: [Select one...▾]
Ethnicity: [Select one...▾]

326 — Release Information
Your Release Reference: [ ]
Release File: [ ] [Browse...]

328 — [Create] [Cancel]

*FIG. 3B*

SEAMLESS UPLOAD AND INGEST OF RELEASE FORMS FROM A MOBILE DEVICE TO A DIGITAL MEDIA SYSTEM

TECHNICAL FIELD

Various embodiments generally relate to the uploading of metadata such as forms data from mobile devices to a digital media system and the subsequent processing of the forms data by the digital media system.

BACKGROUND

Online digital media systems enable customers to search for, select, price and license digital media items to be downloaded for subsequent use. Uses for digital media include advertising, incorporation into print publications such as newspapers and magazines, incorporation into online publications such as websites and blogs and personal consumption, such as listening to music at home.

Digital media systems (DMS) enable contributors, i.e. providers of digital media items, to upload digital media to a central repository for search, browsing, licensing and downloading for subsequent use by customers of the DMS. Such a DMS typically provides an interface that enables a contributor of digital media to upload digital media to the DMS, and to interactively specify attributes, or "metadata," that describe, or provide associated information for, the digital media. Such metadata may include a model release form or property release form that states the terms under which the model or property shown in a photo or video may be used. The contributor interface is typically an application, such as a Web-based application, that runs on a contributor computer and interacts with one or more server computers that provide DMS services across a network.

In traditional photography and video, model releases and property releases are typically paper forms that are signed by a model or property owner or manager. With the advent of computers and now smart mobile devices it is possible to display a release form in electronic format on a digital device and to enable a person to sign the form on an interactive interface using a stylus or by gesturing with his/her finger on the display of the mobile device. Further, with the advent of network-connected mobile devices it is possible to upload an electronic release form to a DMS upon signature thus entirely eliminating paper processing.

Thus it would be advantageous if a model or property owner could sign a release form using a mobile device provided by the photographer or contributor and then upload the data directly to the DMS. Further, it would be advantageous if the contributor could add metadata about the release or media items while in the field preferably using the same mobile interface. This would enable seamless integration of electronic release forms uploaded by a contributor using a mobile device to a DMS.

Thus, it is with respect to these considerations and others that the present invention has been made.

SUMMARY OF THE DESCRIPTION

Various embodiments are directed towards integration of electronic forms that are prepared and uploaded using a mobile device into a digital media system. The subject invention enables a contributor of digital media to a digital media system to prepare and upload forms, including model and property releases, from a mobile device to a digital media system. The contributor can subsequently use a contributor computer to access the release forms and apply them to contributed digital media items. In a preferred embodiment, the mobile device runs a native contributor mobile application that communicates with a server computer using standard Web communications, while the contributor uses a Web browser running on the contributor computer to communicate with the server computer. Such an approach enables seamless integration of electronic release forms uploaded by a contributor using a mobile device to a DMS.

In one embodiment, a mobile device authenticates a contributor, and uploads release documents to a digital media licensing server that ingests the model release and makes it available to a contributor using a Web-based contributor client application.

Another embodiment is directed toward a contributor mobile application that enables a contributor to create an electronic release form. The release form includes properties and may be signed by a human model or property owner.

Yet another embodiment is directed toward a contributor interface that enables a contributor to view release forms, create release forms and apply release forms to contributed digital media items.

One embodiment is directed towards a computer-implemented method for applying a form to a media item in a media library, including enabling, by a mobile device, a contributor of media items to prepare a form, uploading, by the mobile device, the form to a server computer that manages a media library, the media library being a collection of media items and forms associated with one or more of the media items, enabling a contributor to upload, from a client computer, different than said mobile device, media items to the media library and enabling, by a client computer that communicates with the server computer, the contributor to associate the form with one or more media items uploaded by the contributor.

Another embodiment is directed towards a system for applying a form to a media item in a media library, including a mobile device, for enabling a contributor of media items to the media library to prepare a form, and uploading the form to a server computer, a server computer for receiving media items from a client computer and storing them in a media library, the media library being a collection of media items and forms associated with one more of the media items;, and receiving the form from the mobile device and storing it in the media library, and a contributor computer, different from the mobile device, for uploading, by the contributor, media items to the sever computer to be stored in the media library, and enabling the contributor to associate the form with one or more media items uploaded by the contributor.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Preferred Embodiment, which is to be read in association with the accompanying drawings, wherein:

FIGS. 3A-B illustrate one embodiment of a user interface for a contributor client application that enables a contributor to view releases, create releases and apply releases to digital media items;

DETAILED DESCRIPTION

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods, processes, systems, business methods or devices. Accordingly, the present invention may take the form of an entirely hardware embodiment, an entirely software embodiment or an embodiment combining software and hardware aspects. The following detailed description is, therefore, not to be taken in a limiting sense.

As used herein the following terms have the meanings given below:

Digital media item, digital media, or media item—means a file or unit of information stored in digital format that can be referred to, displayed or played. Digital media includes digital photographs, commonly referred to as "digital images" or simply "images", digital videos, vector art, animation files such as Adobe FLASH files, sound files, and the like. For embodiments discussed herein, digital media may comprise content that was originally created digitally, or content that was converted from analog to digital format.

Metadata—refers to information that describes, or provides information supplemental to, digital media. Metadata includes, inter alia, title, subject, description, keywords, date created, dated edited, category, license category and price. Metadata may be included within the digital media files or stored separately in a file or a database. Note that metadata refers to information that is intrinsic to the media asset such as its known subject, keywords that describe the media content, color model, media owner, media copyright holder, file format, and other information provided by a content contributor or readily determined from the digital media content. Metadata may also refer to information that has been assigned to the media content such as a model or property release, price model or content category. Metadata enables or improves searching, browsing, filtering, matching and selection of media to view, listen to, watch, purchase or license. Metadata is sometimes referred to as tags.

Applying—means a process of adding or associating metadata, including release forms, to one or more digital media items. This process is also commonly referred to as tagging.

Figure 1:
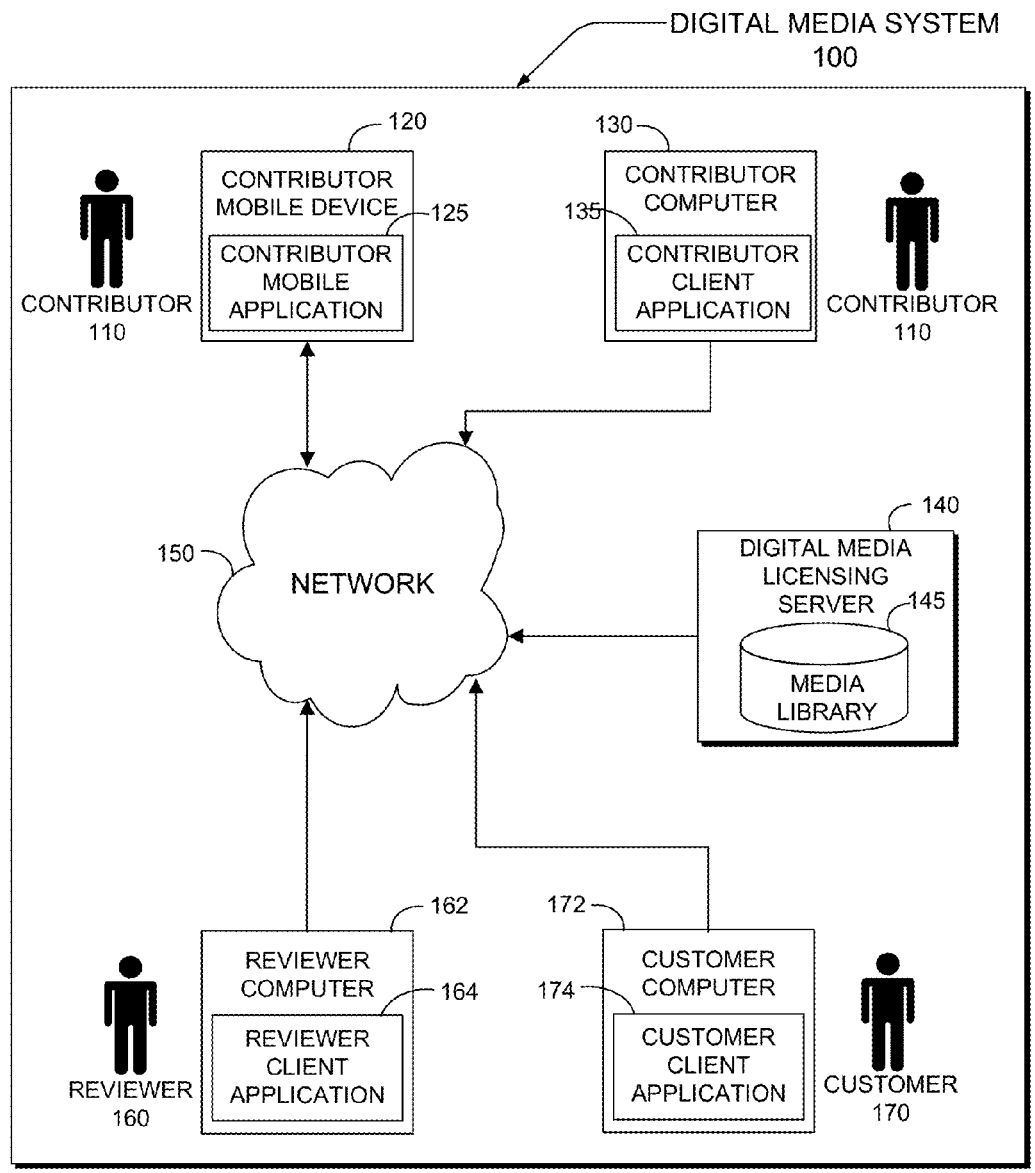
FIG. 1 is a generalized block diagram for an online digital media system (DMS) that enables a contributor to upload model and property releases from a mobile device to a digital media licensing server (DMLS)

Digital media library—means a collection of digital media items provided by a digital media system that are accessed using a client computer. The digital media system described herein with reference to FIG. 1 provides such a digital media library. Some embodiments of a digital media library are also referred to as a stock media library, stock photo library, or stock video library, or clip library.

Contributor—means an person that provides digital media items to a digital media system for inclusion in a digital media library. A contributor may be an owner of the digital media items or a representative of an entity that owns the digital media items.

Customer—means an individual that uses a mobile device, PC or other electronic device capable of accessing a website or other service available across a network, to search for and potentially license or purchase digital media offered by a DMS.

Some of the examples provided herein are constrained to digital media libraries that include only digital images or only digital images and digital video clips. However, the methods, processes, and systems described herein can be applied to digital media libraries that include any type of digital media or content, including, inter alia, images, music and sound, video, movies, graphics, web pages, and text documents.
Generalized Operation The operation of certain aspects of the invention is described below with respect to FIGS. 1-6.

FIG. 1 is a generalized block diagram for an online digital media system (DMS) that enables a contributor to upload model and property releases from a mobile device to a digital media licensing server (DMLS). A contributor 110 uses a contributor mobile application 125 that runs in a contributor mobile device 120 to enter data into forms such as model releases and property releases, referred to generically as "releases". FIGS. 2A-E illustrate one embodiment of a user interface for contributor mobile application 125. The releases are then uploaded to a digital media licensing server (DMLS) 140 across a digital data network 150. In one embodiment, contributor 110 may also upload digital media items from contributor mobile device 120 to DMLS 140. Digital data network 150 is described in further detail with reference to FIG. 5 below.

Contributor 110 may also use a contributor client application 135 that runs in contributor computer 130 to enter data into forms. Contributor client application 135 also enables contributor 110 to enter and edit metadata for contributed digital media items. Contributor client application 135 enables contributor 110 to upload digital media items from contributor computer 130 to DMLS 140. DMLS 140 stores digital media and metadata, including forms and other information provided by contributor 110 in a digital media library 145. Further, contributor client application 135 enables contributor 110 to access additional services provided by DMLS 140, as described below with reference to FIGS. 3A-B. Contributor client application 135 further enables contributor 110 to select contributed digital media items that are ready to be reviewed and/or published.

In one embodiment, when contributor 110 identifies contributed media items that are ready for review to DMLS 140 the media items are provided in a reviewer queue to a human reviewer 160. Reviewer 160 may be a single individual or a plurality of reviewers working cooperatively. Reviewer 160 uses a reviewer client application 164 that runs on a reviewer computer 162 to review contributed media items. Reviewer client application accesses contributed media items, forms and other metadata from media library 145 across network 150 as part of the review process. Typically the review process includes editing metadata, and providing comments, ratings and other review information.

When reviewer 160 completes reviewing contributed media items he/she indicates to DMLS 140, using reviewer client application 164, media items that have been reviewed and which can be published, i.e. made available to customers. The indicated media items are published and can then be accessed from media library 145 by a customer 170.

Typically, customer 170 uses a customer client application 174 running in a customer customer computer 172 to access digital media items and their corresponding metadata from media library 145 across network 150. Customer client application 174 enables customer 170 to search media library 145 for media items, browse media library 145, select and license media items and download media items for subsequent use.

DMS 100 may additionally include an administrative user, an administrative computer and an administrative computer application.

FIGS. 2A-E are embodiments of a user interface provided by contributor mobile application 125 that enable contributor 110 to fill out a model release and upload it to a digital media licensing server.

Figure 2A:
FIGS. 2A-2E illustrate one embodiment of a user interface for a mobile device that enables a contributor to fill out a model release and upload it to a digital media licensing server.

FIG. 2A is an example interface provided by contributor mobile application 125 that enables a contributor 110 to create and edit records of "shoots". A shoot, as used herein, is a term used by photographers and videographers to refer to a number of related photos or videos. Photos and videos from a shoot are typically taken at approximately the same time and place and have the related subject matter. Two entry boxes 204 enable contributor 110 to provide a title and descriptive information about a new shoot. A date control 206 enables contributor 110 to specify the date of the shoot. A keypad 208 displays on request enabling contributor 110 to enter data and to make selections. When contributor 110 has finished he/she uses a cancel/save control 202 to either cancel the operation or save the information.

Figure 2B:

FIG. 2B is an example interface 220 provided by contributor mobile application 125 that enables contributor 110 to create and edit a record for a model and to provide descriptive information about the model. Typically, a model is a person, animal, or physical item such as a car that appears in a shoot. Initially, contributor 110 specifies the name of a model. Typically this done by selecting a name from a list of models or contacts presented by contributor mobile application 125. Alternatively, contributor 110 can create a new model record and enter information pertaining to the model. Contributor 110 can select a photo or video to associate with the model from a media window 222 that displays photos or videos stored on contributor mobile device 120. Typically, the model would appear in such a photo or video. For, it might be a photo that contributor 110 has taken of the model using a camera built into mobile device 120. A number of descriptive fields 224 enable contributor 110 to enter information pertaining to the model such as name, address, phone, email, birthdate, ethnicity and name of guardian.

A menu 226 enables contributor 110 to select the various functions provided by contributor mobile application 125. Contributor 110 uses menu 226 to switch between functions. In one embodiment, the functions available from menu 226 include the ability to create, upload, print, edit, and delete release forms including model and property release forms, to create edit and delete records of shoots, to create edit and delete records of models and edit settings.

Figure 2C:

FIG. 2C is an example interface 240 provided by contributor mobile application 125 that enables contributor 110 to initiate creation of a release form. In one embodiment, interface 240 appears after contributor 110 selects a shoot. Contributor 110 may use a select shoot control 242 to bring up an interface that enables him/her to select a different shoot. Contributor 110 may select a model or property from a list 244. A release control 246 enables contributor 110 to select which type of release to create. In one embodiment, release control 246 enables contributor 110 to select between a model release form, a minor model release form and a property release form. It may be appreciated that this mechanism may be used to select other types of forms and data.

Figure 2D:
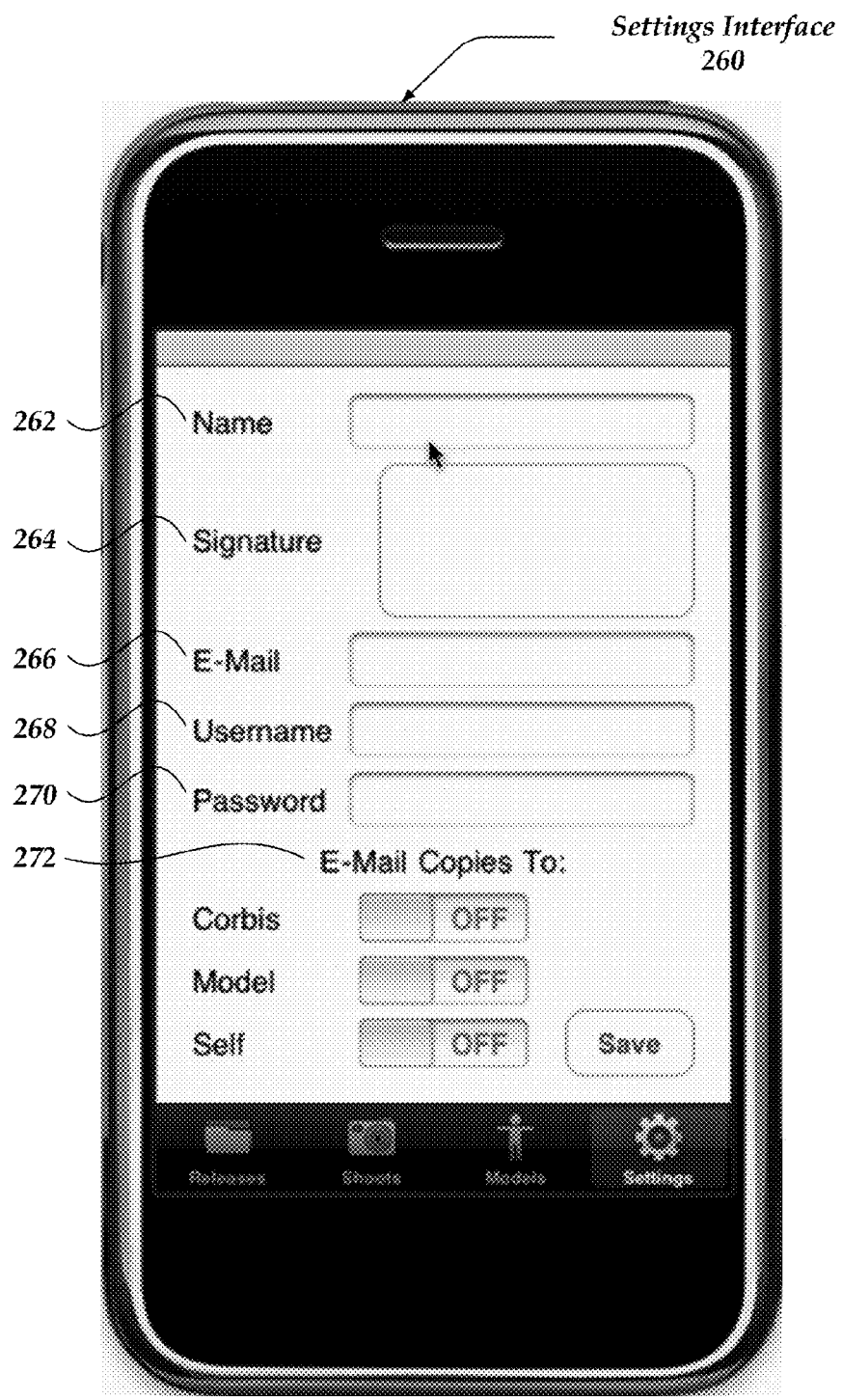
Figure 2E:
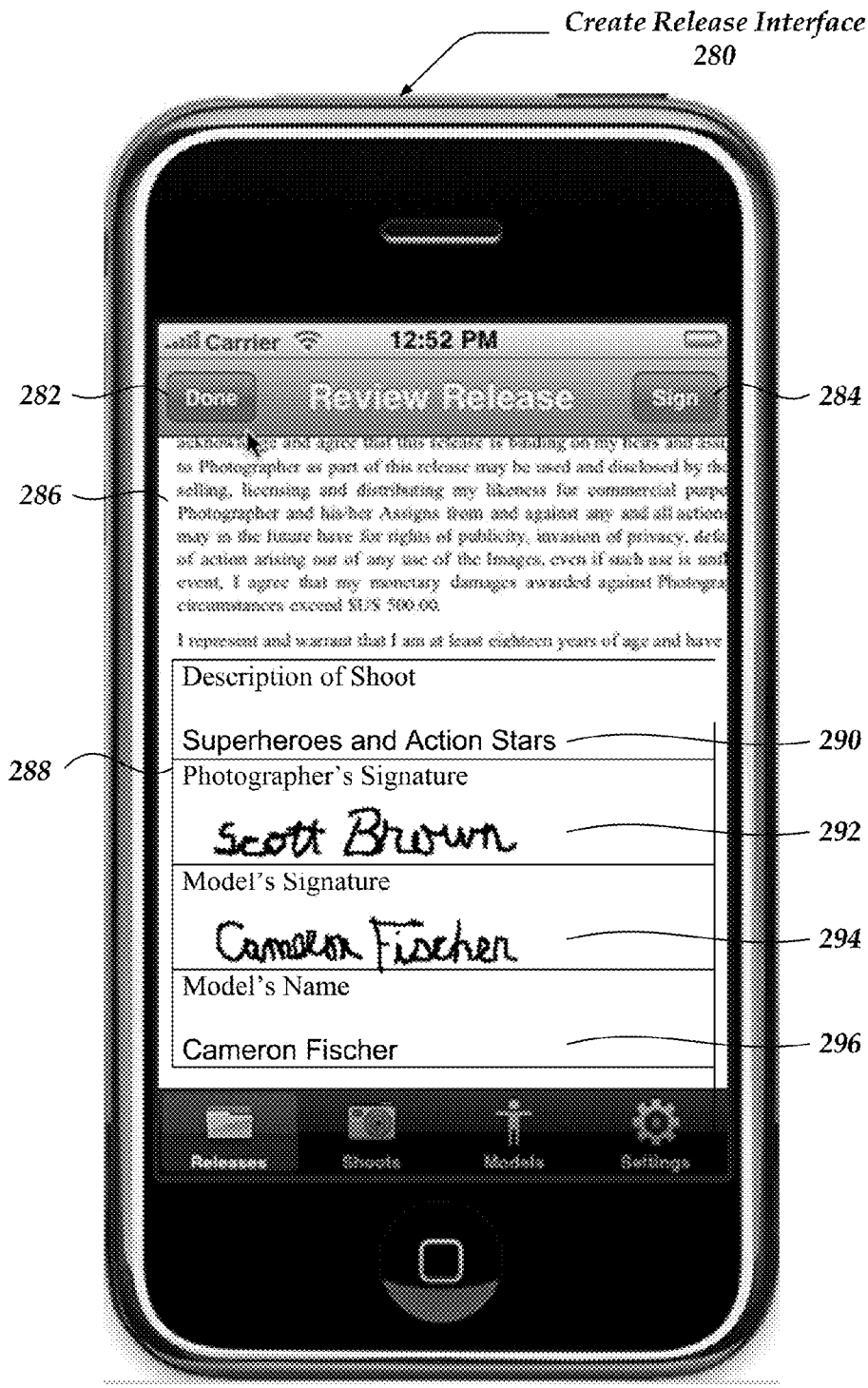

After selecting a release form, contributor mobile application 125 displays the corresponding form with available data filled in, as illustrated in FIG. 2E below. If contributor 110 decides not to select a release he/she uses a cancel control 248 to cancel the operation.

FIG. 2D is an example settings interface 260 provided by contributor mobile application 125 that enables contributor 110 to establish settings to be used when uploading a release form. A name entry field 262 enables contributor 110 to enter his/her name. A signature field 264 enables contribututor 110 to provide his/her signature. An email address field 266 is used by contributor 110 to provide his/her email address. A username field 268 and a password field 270 are used by contributor 110 to provide his/her signin information for DMS 100. In one embodiment, a single username and password are used by contributor 110 to sign-in from contributor mobile device 120 and from contributor computer 130. Finally, contributor 110 uses a set of email selection toggles 272 to indicate who should receive email copies of the release form being uploaded.

FIG. 2E is an example interface 280 provided by contributor mobile application 125 that enables a contributor to create a release form and have it signed by a model. As previously mentioned, a release form appears when contributor 110 selects a type of release form to create using release control 246 in interface 240. As illustrated in create release interface 280, a model release is a form to be signed by contributor 110 and also by the person that is releasing the media item, typically the model.

Exemplary create release interface 280 displays a model release form that includes a text portion 286 and an entry field portion 288. The model release form may also include a thumbnail of the model or property to which the release applies. Portion 288 includes a description of the shoot 290, a field in which the photographer, i.e. contributor 110, signs his/her name 292, a field in which the model signs his/her name 294 and additional information about the model including his/her name 296. The additional information may also include model's contact information. Create release interface 280 includes a signature control 284 that enables a model or contributor 110 to sign the model release form. Signature may be accomplished in a variety of ways, e.g. using a stylus, gesturing with a finger on the display of contributor mobile device 120, providing a verified electronic signature, or by simply typing the model's name.

When contributor 110 finishes preparing the model release he/she clicks a done control 282 to initiate uploading of the form to DMLS 140. Contributor mobile application 125 uses settings established using settings interface 260 to authenticate contributor 110, if necessary, and then to upload the model release form. Thus no further contributor 110 intervention is required. Essentially, from the perspective of contributor 110 sign-in, i.e. authentication, upload and ingest by DMLS 140 is performed with a single click (of done control 282).

In some embodiments only the model or property owner/manager needs to sign the form. While the discussion of FIG.

2A-E relates to the creation and uploading of a model release by a contributor, the invention may include other types of forms or data that is prepared and uploaded to DMLS 140. For example, the method may be extended to the use of property release forms. In this case, contributor mobile device 120 provides an interface comparable to create model interface 220 that enables contributor 110 to create a property record, and an interface comparable to create release interface 280 that enables contributor 110 to create a property release form. Further, it may be appreciated that the method may be practiced where no signature is required. It may further be appreciated that the method may be easily modified to upload digital media items, and other metadata to DMLS 140.

FIG. 3A illustrates one embodiment of a user interface that enables contributor 110 to view and apply existing model releases. Typically, apply release interface 300 appears after contributor 110 has first selected one or more media items from a browse or search interface and then selects an apply existing releases function from a menu or by using another user interface function selection mechanism. Apply release interface 300 displays a list of releases 302 where row in the list provides information and controls pertaining to a single, previously created, release. Each release in list of releases 302 has either been previously uploaded by contributor 110 using contributor mobile application 125 or has been added by contributor 110 using contributor client application 135, as discussed below with reference to FIG. 3B. Each entry in list of releases 302 displays the name of the release form, a reference number, the type of release form, and an apply control that enables contributor 110 to apply to or associate corresponding release form with one or more selected media items.

FIG. 3B is an illustration of one embodiment of a user interface that enables contributor 110 to create a new release record. Typically, create release interface 320 appears after contributor 110 selects a create release function from a menu or by using another user interface function selection mechanism. If contributor 110 has first selected one or more media items from a browse or search interface then any release record created using create new release interface 300 is applied to the selected media items. Further, any release record created using create release interface 320 subsequently appears in list of releases 302.

Using a release selector 322 contributor 110 selects the type of release form. In one embodiment, the available selections are model release and property release. A set of model information fields 324 enable contributor 110 to provide information about the model. In a preferred embodiment, model information fields 324 include a model name field, an age pull down menu that allows contributor 110 to select from a list of age ranges, and an ethnicity pull down menu that enables contributor 110 to select from a list of ethnicities.

A set of release information fields 326 enable contributor 326 to provide information about the release form to be attached or referenced. In a preferred embodiment, release information fields 326 include a reference field and a path that specifies the location of the release file. Typically, if the release form was uploaded by contributor mobile application 125 the reference field will be automatically filled with the name of the shoot and date. Contributor 110 may replace or augment any automatically provided reference information. In a preferred embodiment, the release file path may be selected by browsing the file system.

Figure 4:
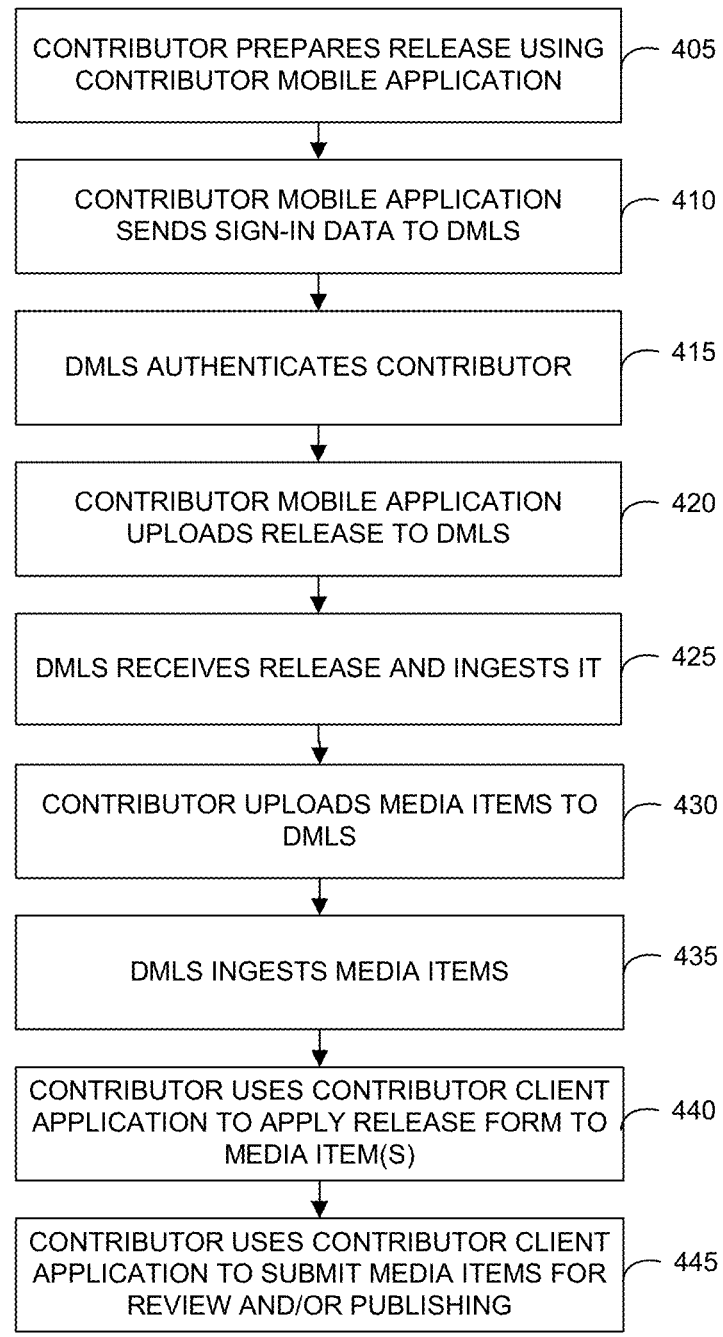
FIG. 4 is a flow diagram that provides an exemplary overall method used by a digital media system to prepare, upload, ingest and apply a release form to media items.

FIG. 4 is a flow diagram that provides an exemplary overall method used by a digital media system to prepare, upload, ingest and apply a release form to media items. At step 405 contributor 110 prepares a release using contributor mobile application 125 running in contributor mobile device 120. As previously described with reference to FIGS. 2A-2E, to prepare a release contributor 110 may perform some or all of the tasks of defining a new shoot, creating a model record, selecting a type of release form to prepare, specifying contributor information including sign-in data using a settings function, and filling out the release form. As part of this step, contributor mobile application 125 enables a person, the "releasor", to sign the release form. Additionally, contributor 110 may also sign the release form. Signature may be accomplished in a variety of ways including gesturing with a finger on the display of contributor mobile device 120.

Upon completion of the release form, at step 410 contributor mobile application 125 sends the contributor sign-in information to DMLS 140. At step 415 DMLS 140 authenticates contributor 110 by comparing the received sign-in data with previously stored sign-in data for contributor 110. As part of authentication, DMLS 140 sends a message in response to contributor mobile application indicating that contributor 110 has been successfully authenticated.

At step 420, upon successful authentication, contributor mobile application uploads the completed release form to DMLS 140. At step 425 DMLS 140 receives the release and ingests it. Ingest refers to the process of adding the the release to media library 145 such that it is available to contributor 110 using, at least, contributor client application 135. Following ingest, at step 425 contributor 110 can access the release using apply release interface 300.

At step 430 contributor 110 uploads one or more digital media items to DMLS 140. In response, DMLS 140 ingests the digital media items which are then available for further review and use by contributor 110 using contributor client application 135. Steps 430 and 435 which relate to uploading and ingest of digital media items are logically but not temporally related to steps 405-425. Thus, contributor 110 may upload media items to DMLS 140 prior to, after or even during the period when he/she is preparing and uploading releases to DMLS 140. For example, contributor 110 may prepare a model release using contributor mobile device 120 during a shoot while working in a location different from his/her office and upload the model release; at the same time, contributor 110 may be using a laptop computer, i.e. contributor computer 130, to upload media items to DMLS 140.

At step 440 contributor 110 uses an interface such as apply release interface 300 provided by contributor client application 135 to apply a release form to one or more media items. Typically, contributor 110 first selects one or more media items using an interface provided by contributor client application 135, and then, using apply release interface 300 selects a release from list of releases 302 and then selects the apply control to apply the release to the selected media items. This step associates the release form with the selected media items. In other words, step 440 adds the release form as metadata for the selected media items.

When contributor 110 finishes preparing media items, for example by adding additional metadata such as release forms, at step 445 contributor 110 submits one or more selected media items. In one embodiment, the submitted media items are provided to a review process in which reviewers review the media items and their associated metadata including any previously applied releases. In this embodiment, one or more human reviewers make the decision as to when to publish the media items, i.e. make them available to customers of DMS 100. One such review process is described is U.S. patent application Ser. No. 12/143,703, Filed Jun. 20, 2008, entitled "Providing a Rating for Digital Media Based On Reviews And Customer Behavior," by Adam Brotman, et al., which is incorporated herein by reference. In another embodiment, there is no review process and submission and media items submitted by contributor 110 are immediately published and available to customers of DMS 100.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems that perform the specified actions or steps, or combinations of special purpose hardware and computer instructions.

Figure 5:
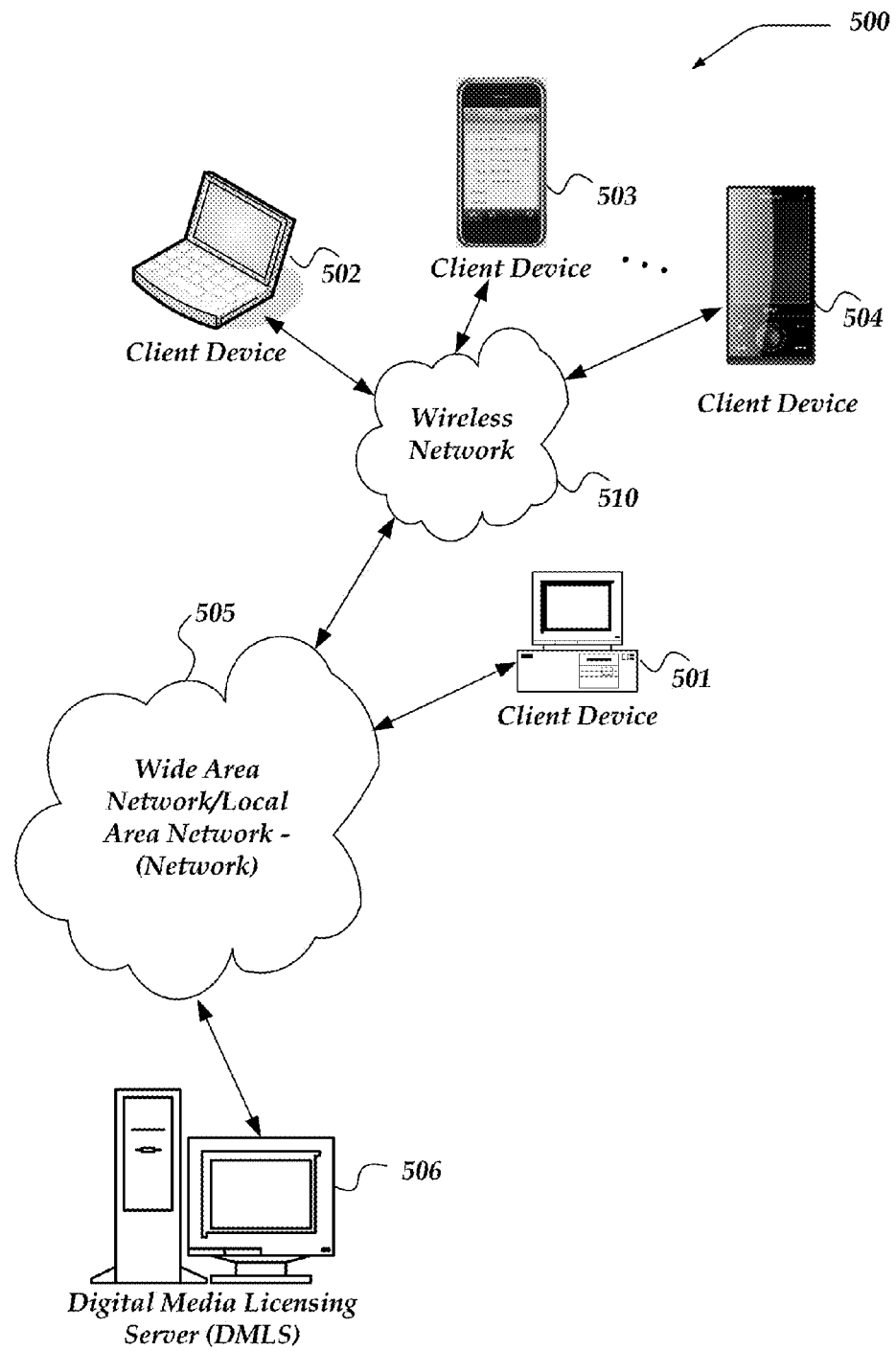
FIG. 5 is a system diagram that shows components of one exemplary environment in which the invention may be practiced.

FIG. 5 is a system diagram that shows components of one exemplary environment in which the invention may be practiced. Not all of the components may be required to practice the invention, and variations in the arrangement and types of the components may be made without departing from the spirit or scope of the invention. As shown, system 500 of FIG. 5 includes wide area network ("WAN")/local area network ("LAN")—(network) 505, wireless network 510, client devices 501-504, and a digital media licensing server (DMLS) 506.

Generally, client devices 501-504 include any computing devices that are capable of receiving and sending messages over a network, such as network 505 or wireless network 510 including personal computers, multiprocessor systems, microprocessor-based or programmable consumer electronics, network PCs, or the like. Client devices 501-504 also include mobile devices such as mobile telephones, smart phones, display pagers, radio frequency (RF) devices, infrared (IR) devices, personal digital assistants (PDAs), handheld computers, laptop computers, wearable computers, tablet computers, integrated devices combining one or more of the preceding devices, or the like.

Specifically, contributor mobile device 120 is an embodiment of client devices 502-504 which connect to wireless network 510. And contributor computer 130, reviewer computer 162 and customer computer 172 are embodiments of client devices 501-504, each of which may connect to either or both of wireless network 510 or network 505. Network 150 is an embodiment of wireless network 510, network 505, or a combination of both. Further, DMLS 140 is an embodiment of DMLS 506.

Client devices 501-504 typically range widely in terms of capabilities and features. For example, a cell phone may have a numeric keypad and a few lines of monochrome LCD display on which only text may be displayed. In another example, a smart phone may be Web-enabled, have a touch sensitive display screen, a stylus and several lines of color LCD display in which both text and graphics may be displayed.

The term touch sensitive display screen is intended to encompass a range of technologies used in products that enable a person to make selections, enter text and information and sign or draw on a display screen using a finger or stylus. Thus, the term touch sensive display screen includes inter alia touch sensitive, heat sensitive and proximity type technologies.

A Web-enabled client device can communicate across the Web. It may include a browser application that is configured to receive and to send web pages, web-based messages, or the like. The browser application may receive and display graphics, text, multimedia, or the like, employing a web-based language, including a wireless application protocol messages (WAP), or the like.

Client devices 501-504 may include client application programs that send and receive content to/from other computing devices. Examples of application programs include calendars, browsers and email clients and so forth. Client devices 501-504 may be configured to include an application program that enables a contributor to complete a model or property release and upload the release to a digital media licensing server such as DMLS 506.

Client devices 501-504 may include or operate in conjunction with a camera that can take digital photographs and/or digital videos which are subsequently stored on the client device.

Wireless network 510 is configured to couple client devices 502-504 with network 505. Wireless network 510 may include any of a variety of wireless networks that provide a connection for client devices 502-504. Such networks may include mesh networks, wireless LAN (WLAN) networks, cellular networks, or the like. Wireless network 510 may further include network devices such as gateways routers, or the like. In essence, wireless network 510 may include virtually any wireless communication mechanism by which information may travel between client devices 502-504 and another computing device, network, or the like.

Network 505 is configured to couple DMLS 506, and client device 501 with other computing devices, including through wireless network 510 to client devices 502-504. Network 505 can include the Internet in addition to local area networks (LANs), wide area networks (WANs), direct connections, such as through a universal serial bus (USB) port, or any combination thereof.

DMLS 506 represents a network computing device that is configured to enable a contributor to upload media items, and releases, a reviewer to review media items and metadata, and a customer to search a digital media library, or database, select digital media items, add the selected items to an electronic cart, and purchase the selected items or licenses to the selected items. Devices that may operate as DMLS 506 include, but are not limited to personal computers, desktop computers, multiprocessor systems, microprocessor-based or programmable consumer electronics, network PCs, servers, network appliances, and the like.

Although DMLS 506 is illustrated as a distinct network device, the invention is not so limited. For example, a plurality of network devices may be configured to perform the functions of DMLS 506. One such configuration is a "server farm" that includes multiple server computers operating cooperatively, each performing some of DMLS 506 server functions. One embodiment of the software modules that perform DMLS 506 server functions is described with reference to FIG. 6 below.

DMLS 506 is capable of running application programs ("applications"). Applications that may be run by DMLS 506 include transcoders, database programs, customizable user interface programs, security applications, encryption programs, VPN programs, web servers, applications servers, account management systems, and so forth. Applications run by DMLS 506 may also include a release service, a contributor interface, a reviewer interface, and a customer interface, and a database manager such as those described below in conjunction with FIG. 6.

DMLS 506 typically provides web services which include any of a variety of network services that are configured to provide content, including messages, over a network to another computing device. Thus, web services include for example, an application server, a web server, a messaging server, a File Transfer Protocol (FTP) server, a database server, a content server, or the like. Web services may provide the content including messages over the network using any of a variety of formats, including, but not limited to WAP, HDML, WML, SGML, HTML, XML, cHTML, xHTML, JSON, SOAP or the like. Web services may also include server-side scripting languages such as PHP, Python, and Java servlets. Web services may also include the server side of the Ajax web development method that enables a server to asynchronously respond to Ajax requests.

DMLS 506 includes data storage for storing program code and data. Data storage may include virtually any mechanism usable for storing and managing data, including but not limited to a file, a folder, a document, a web page or an application, such as a database, digital media including digital images and digital video clips, and the like.

Data storage may further represent a plurality of different data stores. For example, data storage may represent a media library, a contributor database, a customer database, a license database, and a price database such as those described below in conjunction with FIG. 6. Further, data storage may also include network storage or cloud storage in which the physical storage media is accessed across a network.

Figure 6:
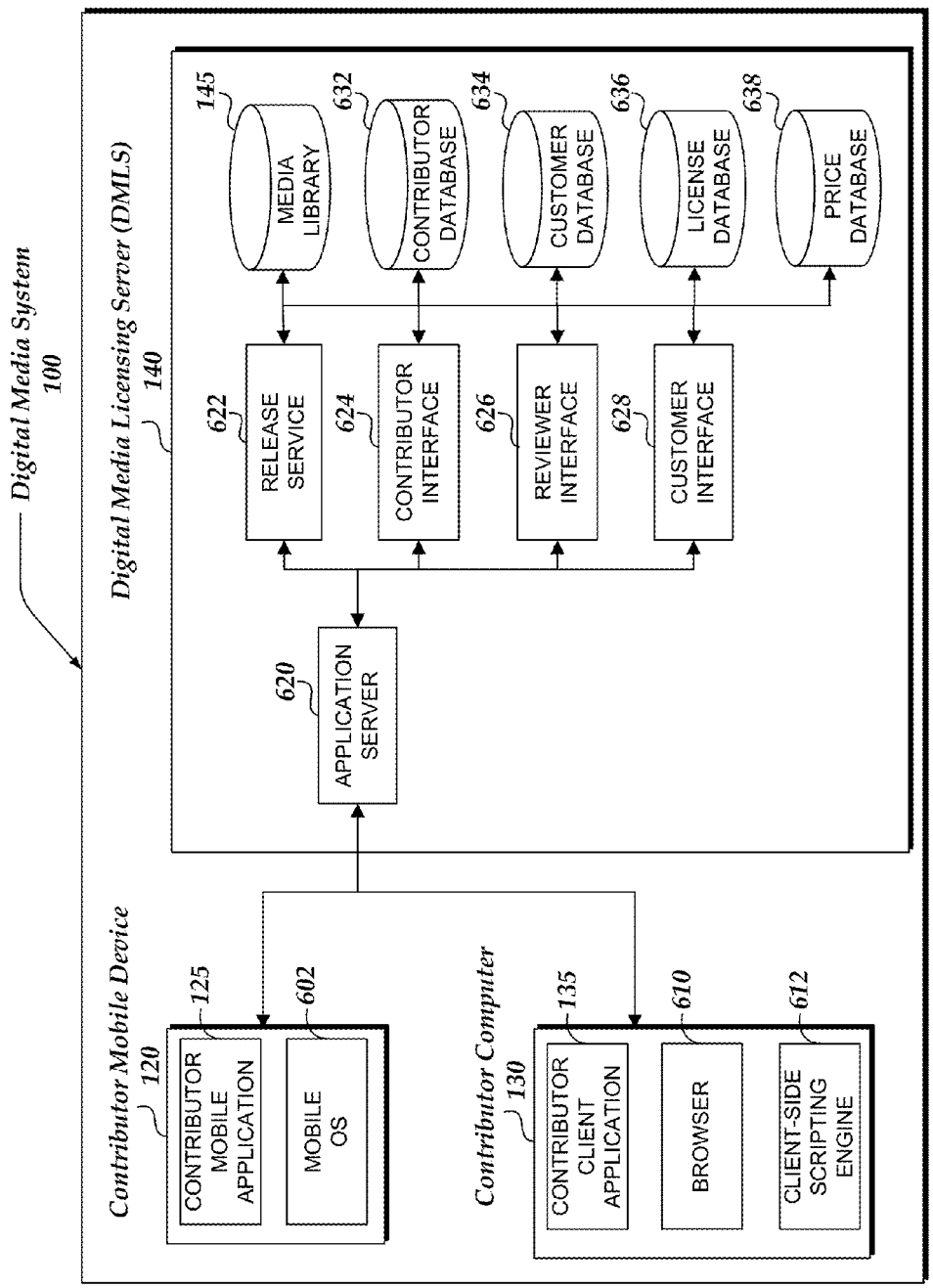
FIG. 6 is block diagram of the exemplary software modules of a contributor mobile device, a contributor computer and a digital media licensing server (DMLS)

FIG. 6 is block diagram of the examplary software modules of contributor mobile device 120, contributor computer 130 and digital media licensing server (DMLS) 140. The software modules of reviewer computer 162 and customer computer 172 are similar to those of contributor computer 130 and not discussed further herein.

Contributor 110 interacts with contributor mobile device 120 via a contributor mobile application 125. In one embodiment, contributor mobile device 120 is a smart phone with a processor and data storage that runs a mobile operating system (OS) 602. Typically, contributor 110 downloads a "native" contributor mobile application 125 from a "marketplace" or online store that provides such native applications that are are developed for and run in conjunction with mobile OS 602. Examples of commercially available contributor mobile devices and their respective mobile OS are APPLE COMPUTER's IPHONE which uses APPLE COMPUTER's IPHONE OS (iOS), and the MOTOROLA DROID which runs the Google ANDROID operating system (ANDROID). Contributor mobile application 125 executes under mobile OS 602.

As discussed above with reference to FIG. 1, contributor 110 interacts with contributor computer 130 via contributor client application 135. In a preferred embodiment, contributor client application 135 is a Web application, that is it is written using standard Web programming languages such as HTML, JAVASCRIPT, and JAVA, and is executed by a browser 610 that runs in contributor computer 130.

Browser 610 is typically a standard, commercially available, browser such as MOZILLA FIREFOX or MICROSOFT INTERNET EXPLORER. Alternatively, it may also be a client application configured to receive and display graphics, text, multimedia, and the like, across a network.

In one embodiment, browser 610 interacts with a client-side scripting engine 612 that executes client-side scripting instructions written in a client-side scripting or programming language such as JAVASCRIPT® from ORACLE CORPORATION of Redwood Shores, Calif., the Java open source programming language, ACTIVEX® from the MICROSOFT CORPORATION of Redmond, Wash., and the like. In one embodiment, browser 610 is configured to use the Ajax (asynchronous JavaScript and XML or JSON) web development techniques that are used to create interactive web applications. Rather than referring to a specific standard or product, the term Ajax represents a broad group of web technologies that are used to implement a Web application that communicates with a server in the background, without interfering with the current state of a web page. Ajax enables browsers to asynchronously request incremental pieces of information from the server instead of whole pages. Ajax typically works with XML or JavaScript Object Notation (JSON) and a client-side scripting language such as JavaScript or ActiveX.

In one embodiment, when contributor 110 accesses DMLS 140 using contributor client application 135, DMLS 140 downloads web pages in HTML format to browser 610 for viewing and interactive use. To perform some of the advanced client-side interactive functions, described with respect to FIGS. 3A-B, the web pages may include client-side scripting instructions. Typically, such client-side scripting instructions are embedded in HTML web pages and are interpreted or executed by client-side scripting engine 612 to perform functions not available through HTML commands such as advanced graphics, database access, and computations.

In one embodiment, JavaScript is used as a client-side scripting language. JavaScript is supported by most commercial browsers including MOZILLA FIREFOX, MICROSOFT INTERNET EXPLORER AND APPLE SAFARI. For purposes of specificity, all of the client-side capabilities described herein can be accomplished using browser 610 in conjunction with JavaScript version 1.5, or greater. A description of JavaScript version 1.5 may be found in the book *JavaScript: The Definitive Guide*, by David Flanagan, August 2006, published by O'Reilly Media, Inc., which is incorporated herein by reference. In one embodiment, JavaScript commands are embedded inside HTML files and are processed by a JavaScript engine which is an embodiment of client-side scripting engine 612.

Contributor mobile application 125 issues hypertext transfer protocol (HTTP) requests to and receives HTTP responses from an application server 620 running in DMLS 140 by making application programming interface (API) calls to mobile OS 602. In contrast, contributor client application 135 issues HTTP requests and receives HTTP responses from application server 620 via browser 610.

Application server 620 receives the HTTP requests and invokes the appropriate digital media licensing server software module to process the request. Application server 620 may be a commercially available application server that includes a web server that accepts and processes HTTP requests transmits HTTP responses back along with optional data contents, which may be web pages such as HTML documents and linked objects (images, or the like). In addition, contributor mobile application 125 or browser 610 may use Ajax to issue requests for XML or JSON-coded information that is delivered asynchronously by application server 620. Henceforth, the term request message will refer to a message sent by either contributor mobile application 125 or browser 610 using HTTP, Ajax or other client-server communications method to DMLS 140. And a response message will refer to a message sent in response, typically using the same communications method, by application server 620 running in DMLS 140.

Application server 620 establishes and manages contributor, reviewer, and customer sessions. Typically application server 620 assigns each session a unique session id. A session lasts from the time a user (i.e. a contributor, reviewer or customer) logs in, or accesses DMLS 140, until the time the user logs out or stops interacting with DMLS 140 for a specified period of time. In addition, application server 620 manages server applications and provides database connectivity.

Upon request by browser 610, application server 620 provides the HTML, JavaScript and other browser-executable code that make up contributor client application 135.

DMLS 140 includes a release service 622, a contributor interface 624, a reviewer interface 626, and a customer interface 628. DMLS 140 further includes five databases: a media library 145, a contributor database 632, a customer database 634, a license database 636, and a price database 638. It may be appreciated that each of the abovementioned databases may be implemented as one or more computer files spread across one or more physical storage mechanisms. In one embodiment, each of the abovementioned databases is implemented as one or more relational databases and is accessed using the structured query language (SQL).

Each of release service 622, contributor interface 624, reviewer interface 626, and customer interface 628 may include a commercial database management system (DBMS) to access and search for data and objects that reside in the database. In a preferred embodiment, the DBMS is a relational DBMS (RDBMS) such as ORACLE® from the Oracle Corporation, SQL Server from the Microsoft Corporation, or the like. However, other database managers may also be used. In another embodiment, a single RDBMS is shared by one or more of release service 622, contributor interface 624, reviewer interface 626, and customer interface 628. In addition to a RDBMS, a standard data extraction tool may be included that simplifies access to relational databases, enabling a developer to express queries visually or in a simplified manner, rather than using structured query language (SQL).

Release service 622 performs authentication of contributor 110 and accepts and processes release forms uploaded by contributor mobile application 125. To perform authentication, at step 410 of FIG. 4, contributor mobile application 125 sends an authentication request message to DMLS 140. Application server 620 receives the authentication request and provides it to release service 622 which authenticates contributor 110 by verifying the contributor 110 sign-in information included in the request message. Then, at step 415 of FIG. 4, application server 620 sends an authentication response message to contributor mobile application 125 indicating that contributor 110 was successfully authenticated. Of course, it is also possible that contributor 110 is not successfully authenticated, for example, in the case that contributor 110 provided the wrong username or password when establishing settings. In that case, contributor mobile application 125 displays a message to contributor 110 requesting that he/she provide new, valid, sign-in information. Release service 622 may also accept requests to process other submissions, beyond release requests, from contributor mobile application 125. For example, it may accept submissions of media items or other types of data such as metadata, a request to change sign-in information and the like.

In one embodiment, a seamless web authentication method is performed between contributor mobile device 120 and DMLS 140 that uses web browser cookies. This is same method commonly used between web interfaces such as contributor client application 135, reviewer interface 626, and customer interface 628 and a web server such as DMLS 140. Using the seamless web authentication method contributor mobile application 125 effectively appears to DMLS 140 as a web browser. In the seamless web authentication method, release service 622 receives a standard authentication request that includes contributor sign-in data. After determining that the name and password are valid, release service 622 sends a response message that includes a cookie to contributor mobile application 125. A cookie is a small amount of text that accompanies a message. The cookie contains persistent data, typically encrypted, that is stored by a browser for later reference. In the case of the seamless Web authentication the cookie typically includes the name of the user that has been successfully authenticated and an expiration date and time. Until the expiration date and time has passed no further authentication is required. Using APIs provided by mobile OS 602 contributor mobile application 125 may access the cookie to determine whether contributor 110 needs to be authenticated.

While the authentication method employed between DMLS 140 and contributor mobile application 125 is invisible to contributor 110, the use of the seamless web authentication method enables mobile devices of any type, from any vendor, to communicate seamlessly to DMLS 140.

Release service 622 receives and processes release request messages from contributor mobile application 125. Each release request includes one or more release forms from contributor 110. Release service 622 stores each release form in media library 145 along with accompanying metadata such as shoot title and description, name and contact information for the model or property. Release service 622 stores the release form and any metadata in media library 145. After processing a release request, release service 622 sends a response message to contributor mobile application 125 indicating success or failure. After successfully processing a release request, the corresponding release form will appear in apply release interface 300 the next time that contributor 110 uses the interface.

Contributor interface 624 interacts with contributor client application 135, i.e. it performs the back-end server processing. Contributor interface 624 responds to requests to provide thumbnails of media items, metadata and release data to contributor client application 135. Contributor interface 624 also enables contributor 110 to apply releases to media items, add, edit and delete metadata and media items.

Reviewer interface 626 responds to requests from reviewer client application 164 i.e. it performs the back-end server processing. Reviewer interface 626 satisfies requests to provide summary data for media items including thumbnails and review forms and stores review information. Reviewer interface 626 manages a queue of media items to be reviewed and provides them to reviewer 160 via reviewer client application 164. Reviewer interface 626 updates the reviewer-edited metadata in media library 145.

Customer interface 628 responds to requests from customer client application 174, i.e. it performs the back-end server processing. Customer interface satisfies requests from customer client application 174 to search, browse, select, and license and download digital media items in media library 145. Customer interface 628 responds to requests for license information for one or more media assets by querying a license database 636 for license information regarding the media items referenced in the request. Such requests for license information include, inter alia, license options, availability for licensing, and licenses in force. Customer interface 628 responds to requests for prices. Customer interface 628 obtains price information for one or more media items from price database 638. In one embodiment, customer interface 628 can obtain a price in either or both of a cash or credits denominations. In one embodiment, customer interface 628 manages an electronic cart for one or more customers. Customer interface 628 responds to request messages to update information about electronic carts that it manages.

Media library 145 stores digital media items and metadata for each media item including releases. Typically, digital media items and metadata are stored and retrieved using a database management system. In one embodiment, each media item is described by a database record that includes fields such as those listed and described in Table 1 below:

TABLE 1

Media Library Database Fields For A Media Item

| Name Of Field | Description |
| --- | --- |
| Unique ID | Unique identifier for the media item. Used as key to access database information about the media item. |
| Title | Title of media item. The title is typically displayed to the customer. |
| Releases | Summary information and URL or other locator information for any release that has been applied to the media item. |
| Price | Pricing information associated with the media item, such as price tier or price model or price. |
| Attributes | A list of attributes possessed by the media item, such as media type (photography, illustration, vector illustration, etc.), color model (color, black and white, etc.), aspect ratio (vertical, square, panoramic), size and resolution. |
| Keywords | List of keywords used for searching. |

In another embodiment, the fields listed in Table 1 are stored as a relational table using a relational database management system where the Unique ID field serves as the key. In one embodiment, digital media items such as digital images and digital video clips are stored outside the relational database(s) that implement media library 145, e.g. in the local file system, or in remotely accessible network storage, and a unique identifier which references the media item is stored inside the database. In another embodiment, digital media items such as digital images and digital video clips are stored as binary large objects (BLOBS) within the relational database.

Contributor database 634 stores a contributor record for each contributor to DMS 100, such as contributor 110. Contributor database 632 may also include includes information about models, properties and shoots and other information related to a contributor. A contributor record includes the contributor's name, contact information and a unique identifier.

Customer database 634 stores a customer record for each registered customer. A customer record includes inter alia name, contact information and means of payment information. Name and contact information is typically obtained during registration. Typically, a customer registers with DMS 100 prior to completing his/her first purchase.

License database 636 stores information necessary to enable customer 170 to license media items. License database 636 also stores any special information about individual media items. For example, a media item, such as a photo of a famous actor, may be prohibited from being used for an advertisement for an alcoholic beverage. Or, for example, a media item may have special pricing such that it doesn't fit into a price tier.

Price database 638 stores price information for individual media items and/or price information for price tiers to which individual media items are assigned.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for associating a release form with a media item in a media library, comprising:
enabling, by a mobile device, a contributor of media items to prepare a release form;
uploading, by the mobile device, the release form to a server computer that manages a media library, the media library comprising (1) a collection of media items, (2) a collection of release forms, and (3) a media database comprising a record for each media item, the record including metadata about the media item, said metadata including information about release forms associated with the media item;
providing, by the server computer, to a client computer different than said mobile device, an interactive contributor user interface that enables the contributor to:
select one or more media items from the media library; and
designate a release form, previously uploaded to the server computer, to associate with each of the selected one or more media items; and
for each of the selected one or more media items, associating, by the server computer, the respective media item with the designated release form by updating the media database record for the respective media item to indicate the associations;
receiving, by the server computer, a request from a customer computer on behalf of a customer, to license one of the selected media items; and
providing, by the server computer information to the customer computer about the availability for licensing of the selected media item based at least in part on information in the release form associated with the selected media item.

2. The method of claim 1 wherein said preparing a release form includes enabling a person to sign said release form.

3. The method of claim 2 wherein said enabling a person to sign said release form enables the person to sign by gesturing with their finger or with a stylus on a touch sensitive display of the mobile device.

4. The method of claim 1 further comprising:
sending a message by the mobile device to the server computer requesting authentication of the contributor;
authenticating the contributor by the server computer upon receipt of the authentication request message; and
sending a response message from the server computer to the mobile device, upon authentication, indicating whether the contributor was successfully authenticated.

5. The method of claim 1 wherein said contributor user interface further enables the contributor to submit said one or more media items to a review process.

6. The method of claim 4 wherein said contributor user interface further enables the contributor to upload media items to the server computer for inclusion in the media library.

7. The method of claim 1 wherein the release form is a model release form or a property release form that indicates a release of designated rights by the model or an owner of property, that is electronically signed using the mobile device.

8. The method of claim 7 wherein said model release form or property release form includes a digital photo or digital video depicting the model or property.

9. A system for managing a media library, comprising:
a mobile device, for:
  enabling a contributor of media items to the media library to prepare a release form; and
  uploading the release form to a server computer;
a server computer for:
  receiving media items from a client computer and storing them in a media library, the media library comprising (1) a collection of media items, (2) a collection of release forms, and (3) a media database comprising a record for each media item, the record including metadata about the media item, said metadata including information about release forms associated with the media item; and
  receiving from a client computer different than said mobile device, a selection of one or more media items from the media library, and a designation of a release form;
  for each of the selected one or more media items, associating the respective media item with the designated release form by updating the media database record for the respective media item to indicate the association;
  receiving a request from a customer computer on behalf of a customer to license one of the selected media items;
  providing information to the customer computer about the availability for licensing of the selected media item based at leat in part on information in the release form associated with the selected media item;
a contributor computer for:
  uploading, by the contributor, media items to the sever computer to be stored in the media library; and
  enabling the contributor to select one or more media items in the media library and to designate a release form to associate with each of the selected media items; and
a customer computer for issuing a request to the server computer on behalf of a customer to license one of the selected media items.

10. The system of claim 9 wherein said preparing a release form includes enabling a person to sign said release form.

11. The system of claim 10 wherein said enabling a person to sign said release form enables the person to sign by gesturing with their finger or with a stylus on a touch sensitive display of the mobile device.

12. The system of claim 9 wherein:
said mobile device further sends a message to the server computer requesting authentication of the contributor; and
said server computer further:
  receives the message requesting authentication;
  authenticates the contributor upon receipt of the message requesting authentication; and
  sends a response message to the mobile device, upon authentication, indicating whether the contributor was successfully authenticated.

13. The system of claim 9 wherein said contributor computer further enables the contributor to submit said one or more contributor media items to a review process.

14. The system of claim 9 wherein said contributor computer further enables the contributor to upload release forms to the server computer.

15. The system of claim 9 wherein the release form is a model release form or a property release form, for media items to which the model or an owner of the property has rights, that is electronically signed using the mobile device.

16. The system of claim 9 wherein said model release form or property release form includes a digital photo or digital video depicting the model or property.

17. A network device for associating a release form with a media item in a media library, comprising:
a transceiver to send and receive data over a network; and
a processor that is operative to perform actions, comprising:
  receiving over the network from a mobile device a release form;
  storing the release form in the media library, the media library comprising (1) a collection of media items, (2) a collection of release forms, and (3) a media database comprising a record for each media item, the record including metadata about the media item, said metadata including information about release forms associated with the media item;
  receiving over the network from a client computer, different than the mobile device, media items from a contributor of media items to the media library;
  storing the media items in the media library; and
  receiving from the client computer a selection of one or more media items from the media library and the designation of a release form;
  for each of the selected one or more media items, associating the respective media item with the designated release form by updating the media database record for the respective media item to indicate the association
  receiving a request from a customer computer on behalf of a customer, to license one of the selected media items; and
  providing information to the customer computer about the availability for licensing of the selected media item based at least in part on information in the release form associated with the selected media item.

18. The network device of claim 17 wherein the processor is configured to perform actions, further comprising:
receiving from the mobile device a message requesting authentication of the contributor;
authenticating the contributor; and
sending a response message to the mobile device, upon authentication, indicating whether the contributor was successfully authenticated.

19. The network device of claim 17 wherein the processor is configured to perform actions, further comprising receiving from the client device instructions from the contributor to submit said one or more contributor media items to a review process.

20. The network device of claim 17 wherein the release form is an electronically signed model release form or property release form that indicates a release of designated rights by a model or an owner of property.

* * * * *